United States Patent [19]

Diemer

[11] Patent Number: 4,888,111
[45] Date of Patent: Dec. 19, 1989

[54] PROCESS FILTER

[75] Inventor: Wolfgang Diemer, Waldstetten, Fed. Rep. of Germany

[73] Assignee: Schenk Filterbau GmbH, Fed. Rep. of Germany

[21] Appl. No.: 127,423

[22] Filed: Dec. 1, 1987

[30] Foreign Application Priority Data

Dec. 9, 1986 [DE] Fed. Rep. of Germany ....... 3641952

[51] Int. Cl.$^4$ ............................................. B01D 29/02
[52] U.S. Cl. .................................... 210/178; 210/179; 210/184; 210/413; 210/415; 422/135; 422/138; 366/147
[58] Field of Search ............... 210/178, 179, 184, 413, 210/415, 456, 219, 405; 422/135, 138; 366/147

[56] References Cited

U.S. PATENT DOCUMENTS

| | | | |
|---|---|---|---|
| 1,587,840 | 6/1926 | Kilmer | 366/147 |
| 1,962,803 | 6/1934 | Bruins | 366/147 X |
| 3,743,539 | 7/1973 | Kroyer et al. | 366/147 X |
| 3,788,392 | 1/1974 | Abbott et al. | 366/147 X |
| 4,315,757 | 2/1982 | Woodmansee | 366/147 X |

Primary Examiner—David L. Lacey
Assistant Examiner—Thi Dang
Attorney, Agent, or Firm—Welsh & Katz, Ltd.

[57] ABSTRACT

A process filter is provided with a heatable container within a rotating drive shaft moveable in an axial direction. To the agitating mechanism shaft is fastened a paddle support with paddles. The shaft is introduced over an inward-drawn container neck into the interior of the container. The shaft is hollow, with a feed line and a return line for the flow of a heating medium. The paddle support and the paddles have interior heating channels which connect with the feed line and the return line in the hollow shaft for the passage of a heating fluid therein.

8 Claims, 6 Drawing Sheets

PROCESS FILTER

This invention relates in general to filters, and more particularly, to filters for use in the chemical and pharmaceutical industry.

BACKGROUND OF INVENTION

In general, process filters, such as that disclosed herein, are described in W. German patent De-PS 30 22 644. The device of this patent permits various mixtures and solutions, particularly in the chemical and pharmaceutical industry, to be mixed, filtered, washed and dried. In the filter taught therein, the heating or the drying process utilizes the wall of the reaction vessel as a heating jacket. To improve the heating performance in the vessel of DE-PS 30 22 644, the container neck is double-walled to permit heating through the container neck. The increased heating surface and the additional heating effect of this vessel is limited, however, because of a relatively small neck surface.

In practice when processing temperature-sensitive products, such as is frequently the case in the pharmaceutical industry, problems of overheating can arise in which the product quality can be degraded or even spoiled. When this happens, a crust forms on the container neck which becomes a thermoinsulating layer, and the heating efficiency declines. If the crust loosens and falls into the mixture being heated, then the product mixture becomes contaminated.

In addition to the heating of the container wall, the crust may itself pose a problem. When heating the container neck and simultaneously agitating the mixture, the product mixture which is between the heated neck surface and the agitating member or paddle is not mixed. On the container neck, then, a crust forms on the heated surface, but not on the rest of the heating surface of the inner wall of the container. This leads to uneven heating as well as the formation of undesirable crust.

In addition, by heating the container neck, the addition of material to the neck walls and subsequent narrowing of the neck opening require adjustments in the various hardware used with the reaction vessel. Thus, agitating members require that greater spacings from the vessel wall be maintained so that no contacts are made with the vessel wall. Because the greater spacings must be used, the product may not be completely coated when drying and when the vessel is emptied, may not be completely discharged. The resulting loss of efficiency can be very serious, as invariably very expensive materials are involved.

SUMMARY OF THE INVENTION

Therefore, an object of the subject invention is a process filter which can heat better, yet avoid overheatings and loss of efficiency.

This and other objects are attained according to the subject invention wherein the agitating shaft of the reaction vessel is hollow, with a feed line and a return line for the flow of a heating medium; paddle supports and agitating members or paddles are provided with interior heating channels that are connected with the feed line and the return line in the hollow shaft for the continuous circulation of the heating medium.

By heating the paddle supports and the paddles, a clearly larger heating surface is provided, with direct and more efficient contact with the product mixture in the vessel. With a relatively steady movement between the paddles and the product mixture, a clearly better exchange of heat is possible.

The paddles and paddle supports are adjustable in their elevational positions within the reaction vessel by a vertically adjustable shaft. Therefore, it is possible to drive into the product intermittently or continuously. In this manner the heating or contact surface of the paddles can be changed as needed, whereby caked material can systemically be peeled off the vessel wall. Through the steady movement and the even temperature exchange overheatings and cakings may be more easily avoided.

Since the neck is no longer heated in a localized manner, the problem of neck size variations is minimized. Further, inordinate heat losses through the neck or additional insulation are avoided, such as may occur with a double jacket.

In one embodiment of the subject invention the feed line issues in the lower end portion of the hollow drive shaft into a heating channel running in the longitudinal direction of the paddle support. This heating channel is connected with corresponding heating channels in the paddles, and the channel outlets are connected by a return line through the shaft.

For the feed line and the return line in the hollow shaft there are various possible constructions. A simple structure has the feed line as a fixed central inner conduit or passageway and the return line as an annular outer concentric conduit or passageway between the inner passage and the inner wall of the hollow shaft. In this possible construction, the stationary inner conduit and the rotating paddle mechanism should have corresponding seals or the like to assure a fluid-tight connection between the return line, the feed line, the paddles, and the paddle support.

The inner conduit may have on the upper portion a sealing head which forms a seal for the feed line and the return line, while permitting the sealing head to be borne on the paddle drive shaft.

At the lower end of the inner passageway there can be provided a split seal, such as a labyrinth seal, to achieve a separation between the inflow of the heating medium and the return flow.

The return line of the heating medium for the paddles to the shaft can take place in any desired manner. For example, the paddles can have cross pipes which issue inwardly into the return line.

Other possibilities exist by which fewer locations for deposit of crust and the like in the vessel are present. One such possibility is that the heating medium in the paddles communicates directly with the hub for the paddle support and the hub presents bores issuing into the return line. In this manner an intermediate piece for the return line is avoided. Rather, for this purpose the hub is used. Thus, it is only necessary to connect the ends directly with the hub.

Advantageously the paddles may have its arms bent in winding form, whereby the product is not only pushed, but properly plowed and turned.

A simple and very efficient shape for turning and shaving the product mixture comprises a paddle support having a generally triangular form in cross section.

The paddles can be pipes to which are laterally applied flat shavers or doctor blades, by which the product mixture is scraped or wiped from the walls of the vessel and the vessel neck.

DETAILED DESCRIPTION OF THE DRAWINGS

The construction and functioning of the process filter are generally known, and therefore only those parts essential to the invention will be described in detail.

Figure 1:
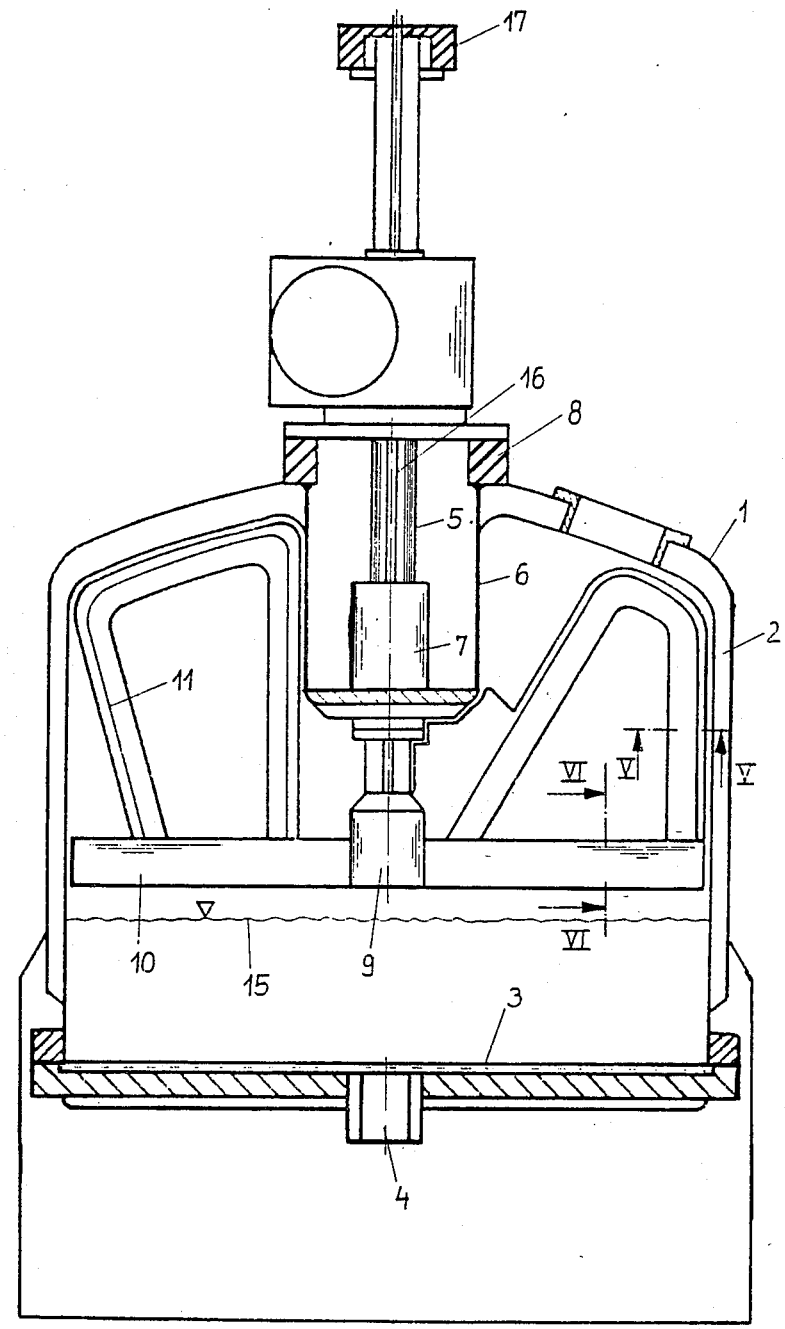
FIG. 1 shows a cross-section of the process filter of the subject invention.

In the position of the reaction vessel shown in FIG. 1 the product to be treated is filtered. The vessel 1 is provided with a heating jacket 2; i.e., it has a double shell. In the lower interior of the container there is a liquid-permeable filter base 3, behind which is a drain opening 4.

Opposite the filter base 3 an agitating mechanism or paddle drive 5 extends through the vessel wall into the interior of the vessel. The vessel has an inwardly directed neck 6. At the lower end of the neck 6 is a guide bearing 7 for the shaft 5. The paddle drive 5 itself and the power drive for the shaft, as well as a stroke arrangement (not shown) are supported on flange 8 seated directly on the vessel.

Hub 9 is secured to the bottom of shaft 5. Over hub 9 is paddle support 10. From the paddle support beam 10 there branch at least one agitating member in the form of a winding or spirally wound arm or paddle 11, and preferably two or three paddles.

Figure 5:
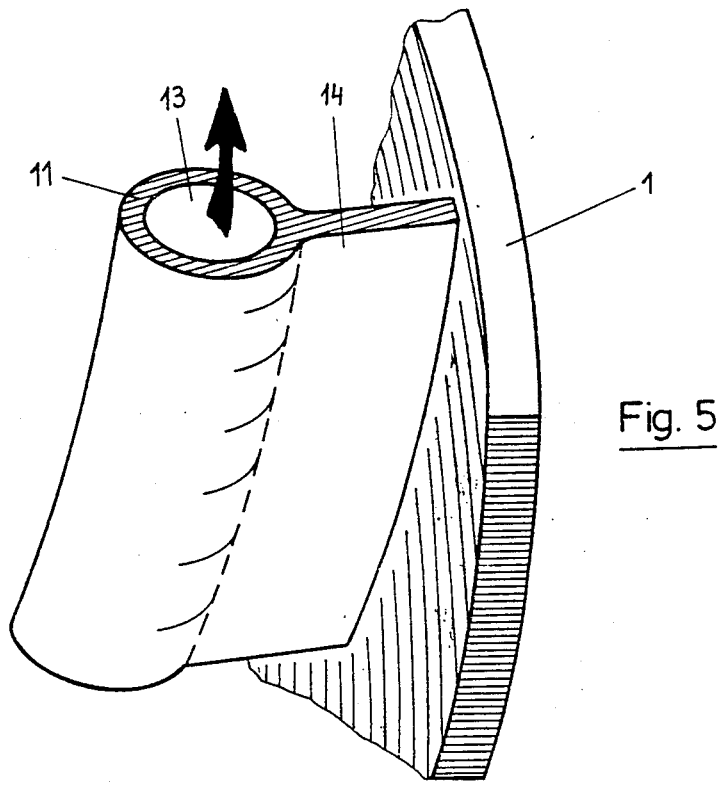
FIG. 5 shows a cross-section along the line V—V of FIG. 1.
Figure 6:
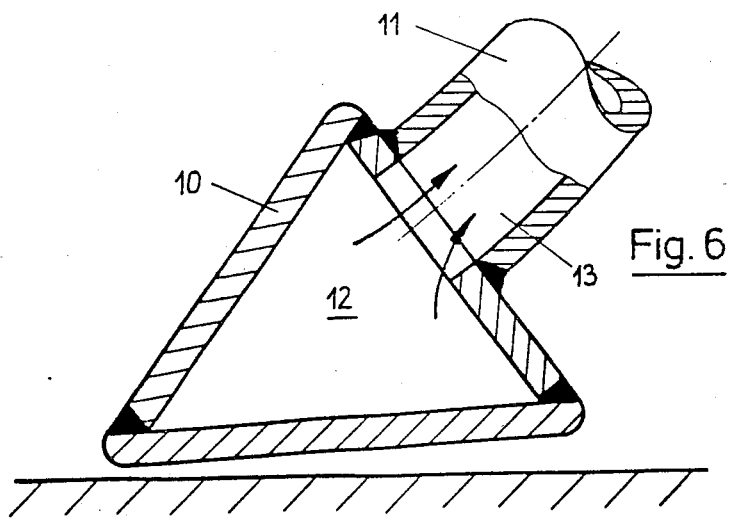
FIG. 6 shows a cross-section along the line VI—VI of FIG. 1.

As is evident from FIGS. 5 and 6, the paddle support 10 and the paddles 11 have heating channels 12 and 13. The paddle support may form a channel with a triangular form that comprises three flat iron pieces. The paddles 11, however, may be in tubular form, onto which flat parts 14, directed laterally toward the inner wall of the vessel 1 and neck 6, are welded as scrapers.

Figure 2:
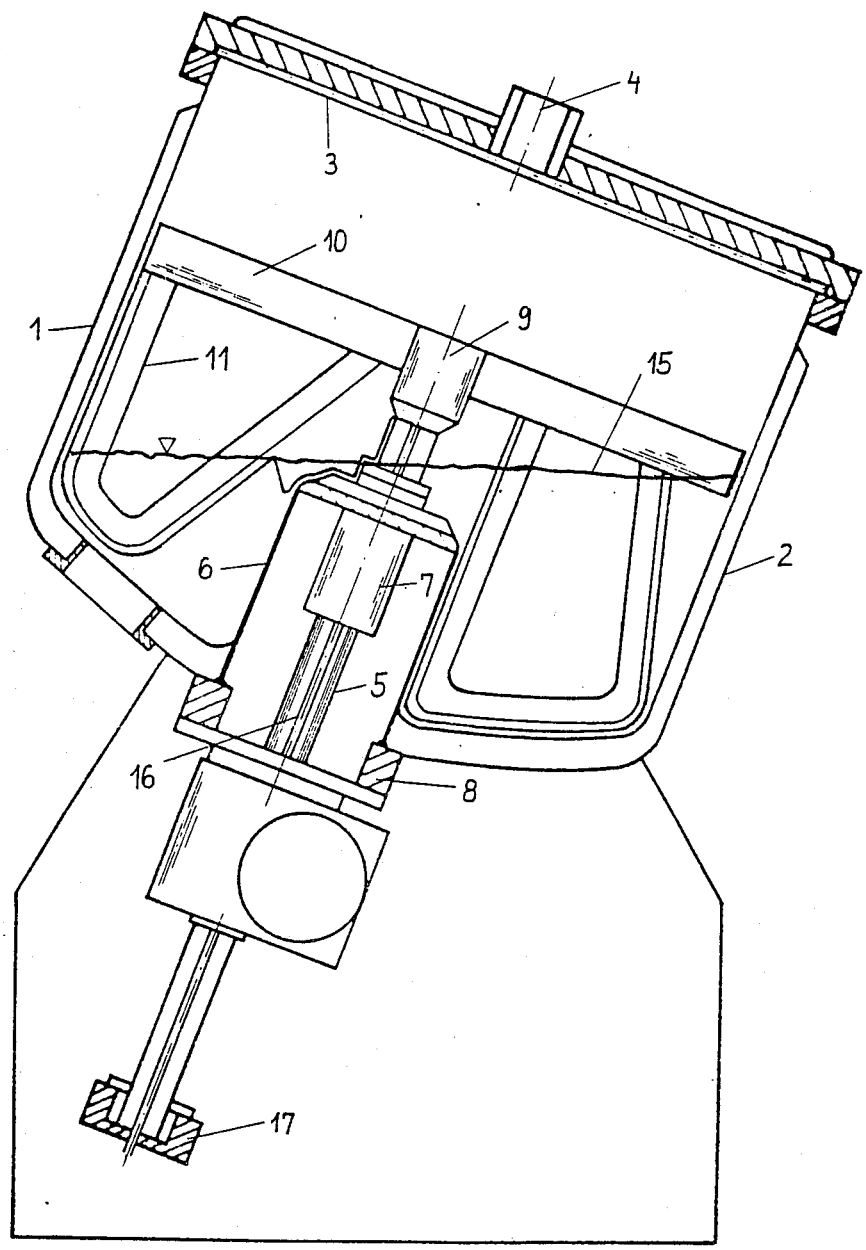
FIG. 2 shows a cross-section of the process filter of FIG. 1 in position for drying.

For the drying process the process filter is swung into the position shown in FIG. 2, which, if need be, can go up to 180 degrees opposite the position shown in FIG. 1. Simultaneously, shaft 5 is thrust into neck 6. The level of the product to be dried can be arbitrarily adjusted to a high level. In FIGS. 1 and 2 it is indicated by the undulating line 15.

Figure 3:
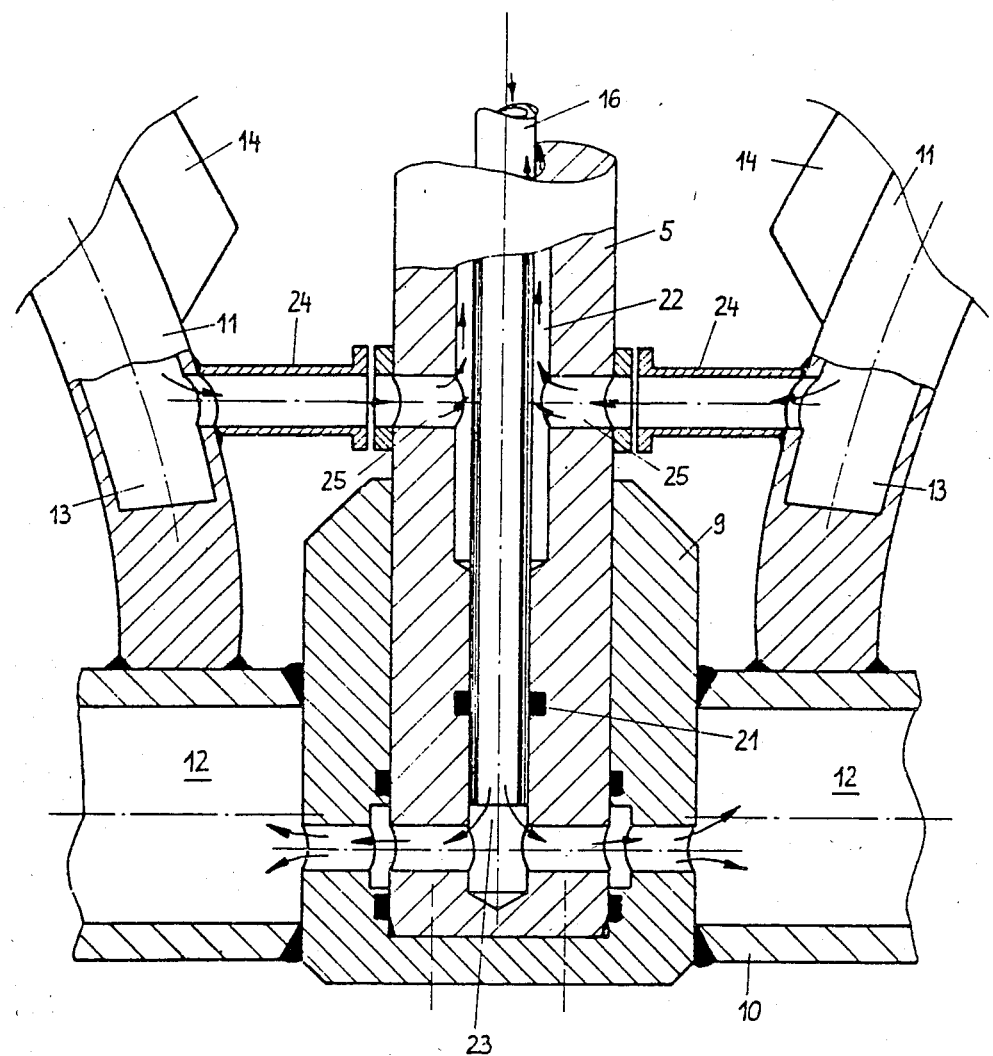
FIG. 3 shows a cross-section of a lower portion of the agitating mechanism shaft of the process filter of FIG. 1.
Figure 4:
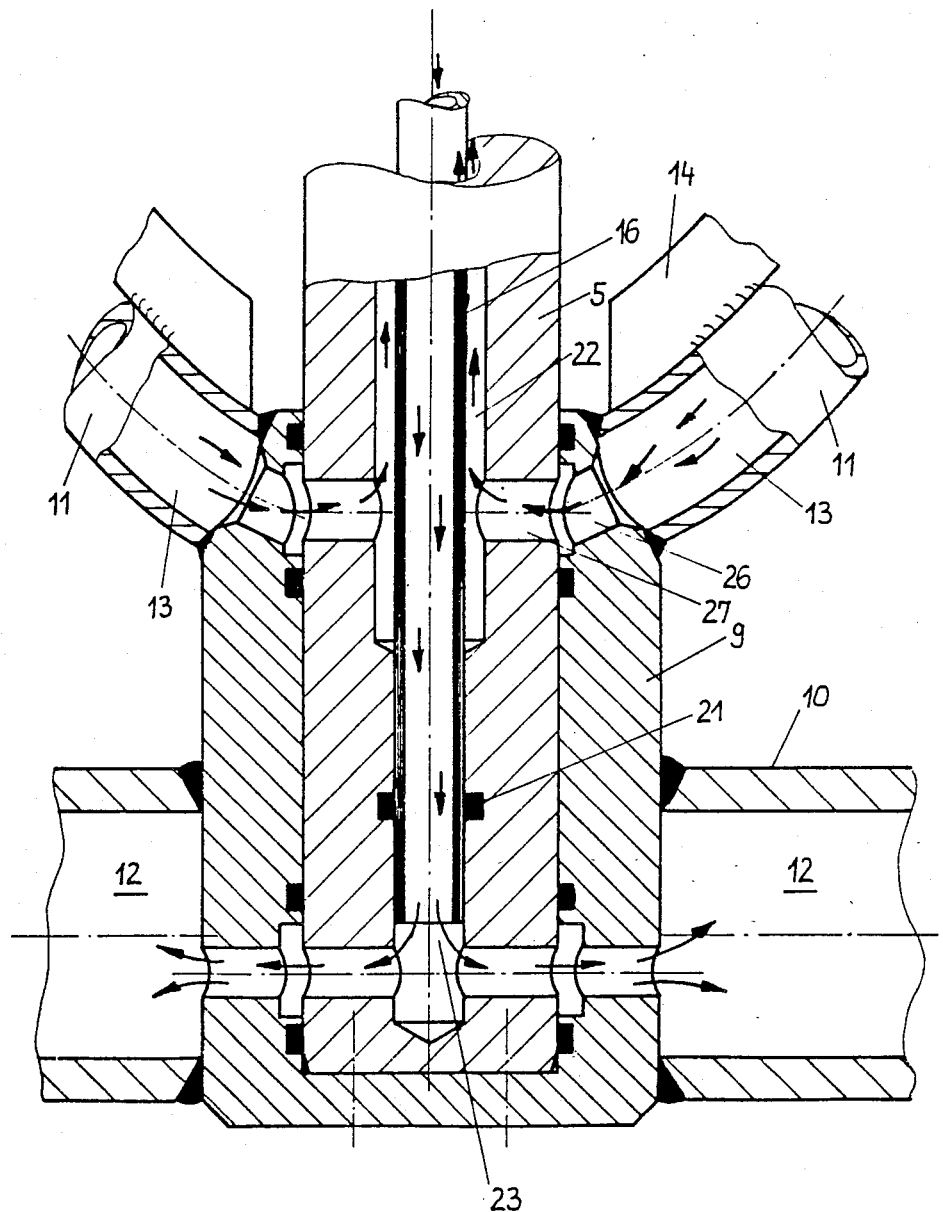
FIG. 4 shows a cross-section, similar to that of FIG. 3, with another type of connection for the agitating members.
Figure 7:
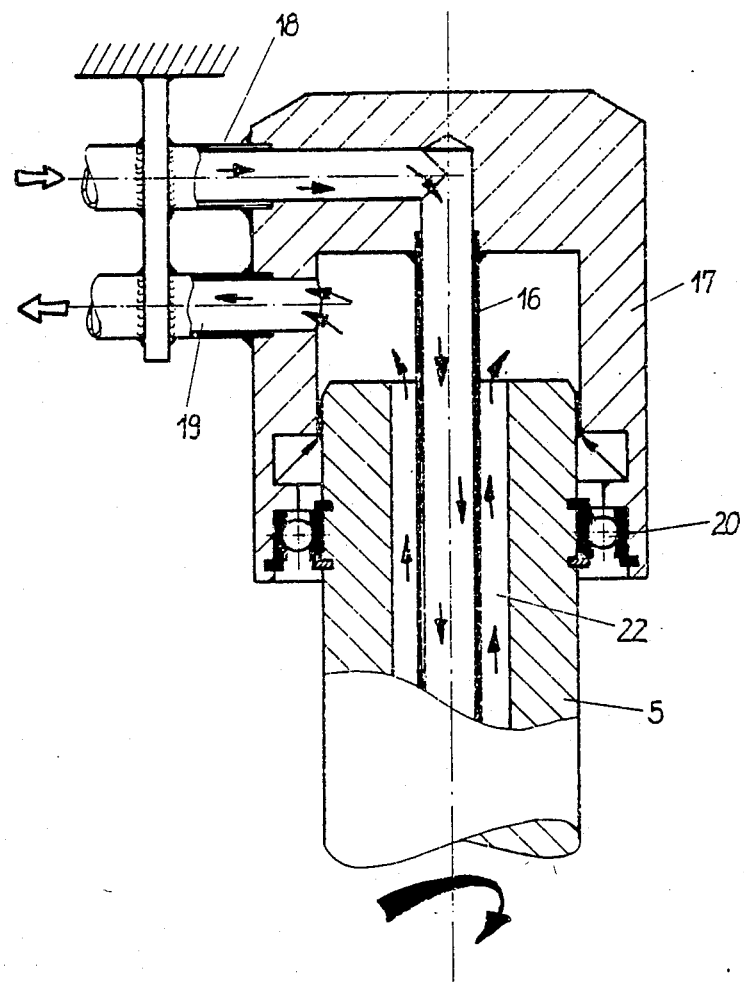
FIG. 7 shows a cross-section through the upper zone of the agitating mechanism shaft.

In FIGS. 3, 4 and 7 is shown more clearly the feed and discharge line of a heating medium which passes through channels 12 and 13. The heating medium is a liquid such as water or other heat transfer fluids.

Shaft 5 which is hollow, has an interior passage or conduit 16 which is fastened at an upper end in sealing cap or head 17. From the sealing head, passage 16 leads through a pipe elbow 18 to a source for heating the fluid (not shown). The sealing head 17 also has an outlet opening 19 for the return of the heating fluid. Between the inner wall of the rotationally symmetrical sealing head 17 and the outer wall of the agitating mechanism shaft 5 is sealed bearing 20, which permits rotation of the shaft 5 while maintaining the integrity of the reaction vessel contents.

At the lower end, between the inner conduit 16 and the inner wall of the agitating mechanism shaft, is a split seal 21, for sealing the inflow of the heating fluid from the return flow. The return flow of the heating fluid utilizes an annular line 22 formed by the outer wall of the inner passage 16 and the inner wall spaced from shaft 5. The return passageway 22 is generally concentric with inner conduit 11.

Shaft 5 has an opening 23 in a lower portion of the inner conduit 16. This lower opening 23 opens into the heating channel 12, running radially throughout the length of the interior of paddle support 10. In the outer zone of the paddles 11, the heating channels 12 of the paddle support communicate with the heating channels 13 of the paddles 11. The heating fluid circulates through the paddles from the outside inward. However, the reverse direction is also possible. For example, the inflow may take place over the annular line 22 and the return flow over the inner conduit 16.

As shown in FIG. 3, the inner ends of the paddles 11, which are closed, are fastened to the paddle support 10. A short cross tube 24 branches off radially inward from the end portions of channels 13. Over the cross tubes 24, and bores 25 aligned therewith in the circumferential wall of shaft 5, is a connection to the annular line 22 for communication of channels 13 with return line 22.

Instead of a connection of the heating channels 13 with annular line 22 through the cross tubes 24, the fastening hub can also be used as shown in FIG. 4. In this case, paddles 11 are directly connected with the hub 9, which has a sloping surface, thereby providing a good connection with the paddles. Oblique bores 26 in the hub 9 and transverse bores 27 in the shaft 5 provide connection with the return line 22.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

I claim:

1. Filter apparatus comprising in combination:
    (a) a container vessel, said vessel having a top, a bottom, and a sidewall, and said vessel being rotatably mounted on a support means for rotation so that the vessel bottom is movable to above the vessel top for drying;
    (b) a rotatable adjustable shaft within said container vessel, said shaft being adjustable to different elevational positions within said container vessel, said shaft having a lower end within said vessel and an upper end exterior of said vessel, and said shaft being centrally vertically located within said vessel so that the shaft lower end is spaced from said vessel bottom;

(c) filter means within the container vessel, positioned below said rotatable adjustable shaft and adjacent said vessel bottom;

(d) a central fluid passageway extending within said rotatable adjustable shaft from said upper end to said lower end;

(e) an annular fluid passageway extending with said rotatable adjustable shaft from said upper end to said lower end and encompassing said central passageway;

(f) a hollow paddle support member extending laterally from the lower end of said rotatable adjustable shaft, said support member having an inner end at said shaft lower end and having an outer end adjacent the vessel sidewall, and said paddle support member including an interior consisting essentially of a single fluid passageway extending longitudinally within said support member;

(g) means communicating said shaft central passageway with the inner end of said paddle support member single passageway;

(h) a hollow paddle member mounted on said paddle support member, said paddle member having a shape conforming with the upper portion of said vessel sidewall and with said vessel top, and said paddle member having an outer edge spaced from said vessel sidewall and top;

(i) a single paddle member fluid passageway contained within said paddle member and extending along said outer edge, said paddle member passageway having a first end adjacent said paddle support member outer end and a second end adjacent said rotatable adjustable shaft lower end;

(j) means communicating said paddle support member passageway outer end with said paddle member passageway first end;

(k) means communicating said paddle member passageway second end with said annular passageway lower end of said rotatable adjustable shaft;

(l) scraper means mounted on said paddle member outer edge and extending outwardly therefrom to the surface of said upper portion of the vessel sidewall and to the surface of said vessel top, so that rotation of the rotatable adjustable shaft causes said scraper means to remove caked material from said surfaces when said shaft is adjusted to operating position and rotated; and, (m) a liquid outlet means centrally located in said vessel bottom in axial alignment with said centrally located rotatable adjustable shaft.

2. The filter apparatus of claim 1 wherein said shaft upper end terminates in a sealing head containing a seal isolating said central passageway from said annular passageway.

3. The filter apparatus of claim 1 wherein said shaft lower end contains a split seal isolating said central passageway from said annular passageway.

4. The filter apparatus of claim 1 wherein said paddle member is in the form of a spirally wound arm.

5. The filter apparatus of claim 1 wherein said paddle support member is triangular in cross-section.

6. The filter apparatus of claim 1 wherein said paddle member is tubular in cross-section and said scraper means is flat and laterally positioned on said paddle member.

7. Filter apparatus of claim 1 wherein said shaft lower end terminates in a hub and said communicating means includes a bore passing through the upper portion of said hub and the lower portion of said shaft, and said paddle member passageway second end terminates at said bore, whereby said paddle member passageway communicates with said annular passageway lower end.

8. Filter apparatus of claim 1 wherein said communication means includes a bore through said shaft lower end and a tubular member passing from said bore to the paddle member passageway second end, whereby said paddle member passageway communicates with said annular passageway lower end.

* * * * *